(12) United States Patent
Fadgen et al.

(10) Patent No.: US 11,255,436 B2
(45) Date of Patent: Feb. 22, 2022

(54) CIRCUMFERENTIAL ARCHBOUND CARBON SEAL ON CERAMIC RUNNER

(71) Applicant: Rolls-Royce Corporation, Indianapolis, IN (US)

(72) Inventors: Daniel L. Fadgen, Indianapolis, IN (US); John Munson, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 552 days.

(21) Appl. No.: 16/205,943

(22) Filed: Nov. 30, 2018

(65) Prior Publication Data
US 2020/0173557 A1    Jun. 4, 2020

(51) Int. Cl.
*F16J 15/26* (2006.01)
*F01D 25/18* (2006.01)
(Continued)

(52) U.S. Cl.
CPC ............ *F16J 15/26* (2013.01); *F01D 25/183* (2013.01); *F16J 15/3264* (2013.01);
(Continued)

(58) Field of Classification Search
CPC ........ F16J 15/26; F16J 15/3264; F16J 15/441; F16J 15/3284; F16J 15/3496; F16J 15/3464
See application file for complete search history.

(56) References Cited

U.S. PATENT DOCUMENTS 3,874,677 A * 4/1975 Ludwig .................. F16J 15/441
                                                  277/425
5,813,830 A   9/1998 Smith et al.
(Continued)

FOREIGN PATENT DOCUMENTS

CH       685514 A5    7/1995
EP       2474711 A2   7/2012
(Continued)

OTHER PUBLICATIONS

Extended European Search Report, European Application No. 19206252.9-1004, dated Apr. 8, 2020, 7 pages.
(Continued)

*Primary Examiner* — Kristina R Fulton
*Assistant Examiner* — L. Susmitha Koneru
(74) *Attorney, Agent, or Firm* — Barnes & Thornburg LLP

(57) ABSTRACT

A seal assembly is disclosed for sealing a high pressure fluid cavity from a low pressure fluid cavity. The cavities are at least partially disposed between a rotatable shaft and a sump housing. The seal assembly comprises a circumferential runner and a seal ring. The circumferential runner is carried by the shaft and has a radially outward facing seal surface extending axially along the shaft. The seal ring is sealing engaged with the sump housing and has a radially inward facing seal surface that sealingly engages the radially outward facing seal surface of the runner. The runner and the seal ring are formed from materials having coefficients of thermal expansion that are matched to effect sealing engagement between the runner and the seal ring over a predetermined range of operating temperatures.

19 Claims, 2 Drawing Sheets

(51) Int. Cl.
*F16J 15/3264* (2016.01)
*F16J 15/34* (2006.01)
*F16J 15/44* (2006.01)
*F16J 15/3284* (2016.01)

(52) U.S. Cl.
CPC ....... *F16J 15/3284* (2013.01); *F16J 15/3464* (2013.01); *F16J 15/3496* (2013.01); *F16J 15/441* (2013.01)

(56) References Cited

U.S. PATENT DOCUMENTS

| | | | |
|---|---|---|---|
| 6,145,840 A | 11/2000 | Pope | |
| 6,322,081 B1* | 11/2001 | Ullah | F16C 33/76 |
| | | | 277/504 |
| 8,490,982 B2* | 7/2013 | Roche | F01D 11/02 |
| | | | 277/430 |
| 8,657,297 B2 | 2/2014 | Garrison | |
| 9,359,912 B2 | 6/2016 | Ullah et al. | |
| 9,638,326 B2 | 5/2017 | Haynes | |
| 2007/0025835 A1* | 2/2007 | Gockel | F01D 25/125 |
| | | | 415/110 |
| 2009/0142180 A1* | 6/2009 | Munson | F01D 11/003 |
| | | | 415/111 |
| 2014/0159317 A1 | 6/2014 | Jahn | |
| 2014/0265145 A1* | 9/2014 | Copeland, III | F16J 15/3496 |
| | | | 277/405 |
| 2014/0265151 A1* | 9/2014 | Vasagar | F01D 11/003 |
| | | | 277/500 |
| 2015/0184531 A1 | 7/2015 | Baptista | |
| 2017/0234430 A1* | 8/2017 | Fadgen | F16J 15/3464 |
| | | | 277/500 |
| 2017/0234432 A1 | 8/2017 | Burnside et al. | |

FOREIGN PATENT DOCUMENTS

| | | |
|---|---|---|
| EP | 3208502 A1 | 8/2017 |
| WO | 1997026475 A1 | 7/1997 |

OTHER PUBLICATIONS

European Office Action, dated Dec. 15, 2020 in connection with European Application No. 19206252.9-1004, 5 pages.
European Office Action, dated Sep. 9, 2021 issued connection with European Application No. 19206252.9-1004, 4 pages.

\* cited by examiner

CIRCUMFERENTIAL ARCHBOUND CARBON SEAL ON CERAMIC RUNNER

BACKGROUND

Seals and seal assemblies may be used to isolate cavities of different pressures in a machine. For example, in a gas turbine engine a seal assembly may be used to buffer a sump from higher pressure and temperature airflows elsewhere in the engine. Seal assemblies in rotating machines such as gas turbine engines often have difficulty in maintaining an effective seal across all operating conditions of the engine.

SUMMARY

According to some aspects of the present disclosure, a seal assembly is disclosed for sealing a higher pressure fluid cavity from a lower pressure fluid cavity. The cavities are at least partially disposed between a rotatable shaft and a sump housing radially displaced from the rotatable shaft. The seal assembly comprises a circumferential runner and a seal ring. The circumferential runner is carried by the shaft and has a radially outward facing seal surface extending axially along the shaft. The seal ring is sealing engaged with the sump housing and has a radially inward facing seal surface that sealingly engages the radially outward facing seal surface of the runner. The runner and the seal ring are formed from materials having coefficients of thermal expansion that are matched to effect sealing engagement between the runner and the seal ring over a predetermined range of operating temperatures.

In some embodiments the predetermined range of operating temperatures is −65° F. to 1000° F. In some embodiments a coefficient of thermal expansion of the material of the runner is no more than 10% greater than the coefficient of thermal expansion of the material of the seal ring. In some embodiments the coefficient of thermal expansion of the material of the runner is no more than 2% greater than the coefficient of thermal expansion of the material of the seal ring.

In some embodiments the radially inward facing seal surface of the seal ring contacts the radially outward facing seal surface of the runner during rotation of the shaft. In some embodiments the runner comprises ceramic. In some embodiments the runner comprises one or more of silicon carbide, silicon nitride, and alumina. In some embodiments the seal ring is an archbound seal ring and comprises carbon.

In some embodiments the carbon seal ring has a radially outward facing surface, and the seal assembly further comprises a seal housing and a sealing body. The seal housing is disposed between the carbon seal ring and the sump housing. The sealing body is sealingly engaged between the sump housing and the seal housing. In some embodiments the seal housing defines an axially facing surface, and the carbon seal ring sealingly engages the axially facing surface. In some embodiments the seal assembly further comprises an axial coil spring contacting the carbon seal ring at a surface opposite the axially facing surface of the seal housing, the axial coil spring forcibly engaging the carbon seal ring to the seal housing. In some embodiments the seal assembly further comprises a garter spring positioned radially outward of the carbon seal ring and assisting with the sealing engagement of the carbon seal ring to the ceramic runner.

According to further aspects of the present disclosure, an oil-free circumferential seal assembly is disclosed for a machine having a rotatable shaft and an axis of rotation. The seal assembly comprises a ceramic circumferential runner, a mounting element, and an archbound carbon seal ring. The ceramic circumferential runner has a radially outward facing seal surface extending axially along the shaft. The mounting element is affixed around a circumference of the shaft and carries the ceramic runner. The archbound carbon seal ring has a radially inward facing seal surface sealingly engaged with the radially outward facing seal surface of the ceramic runner. The runner and the seal ring are formed from materials having coefficients of thermal expansion that are matched to effect sealing engagement between the runner and the seal ring over a predetermined range of operating temperatures.

In some embodiments the predetermined range of operating temperatures is from −65° F. to 1000° F. In some embodiments the coefficient of thermal expansion of the material of the runner is between 95% and 105% of the coefficient of thermal expansion of the material of the seal ring. In some embodiments the seal assembly further comprises a seal housing disposed radially outward of the seal ring and a sealing body positioned between the seal housing and the sump housing.

According to still further aspects of the present disclosure, a method of sealing a higher pressure fluid cavity from a lower pressure fluid cavity is presented. The cavities are at least partially disposed between a rotatable shaft and a sump housing radially displaced from the rotatable shaft. The method comprises providing a ceramic circumferential runner carried by the shaft having a radially outward facing seal surface extending axially along the shaft; providing a carbon seal ring having a radially inward facing seal surface, wherein the runner and the seal ring are formed from materials having coefficients of thermal expansion that are matched to effect sealing engagement between the radially inward facing seal surface and the radially outward facing seal surface over a predetermined range of operating temperatures; and rotating the rotatable shaft to sealingly engage the radially inward facing seal surface of the carbon seal ring with the radially outward facing seal surface of the ceramic runner.

In some embodiments the coefficient of thermal expansion of the material of the seal ring is between 95% and 105% of the coefficient of thermal expansion of the material of the runner. In some embodiments the predetermined range of operating temperatures is from −65° F. to 1000° F. In some embodiments the method further comprises providing a seal housing coupled to the sump housing; and engaging the seal ring with the seal housing.

BRIEF DESCRIPTION OF THE DRAWINGS

The following will be apparent from elements of the figures, which are provided for illustrative purposes.

Figure 1:
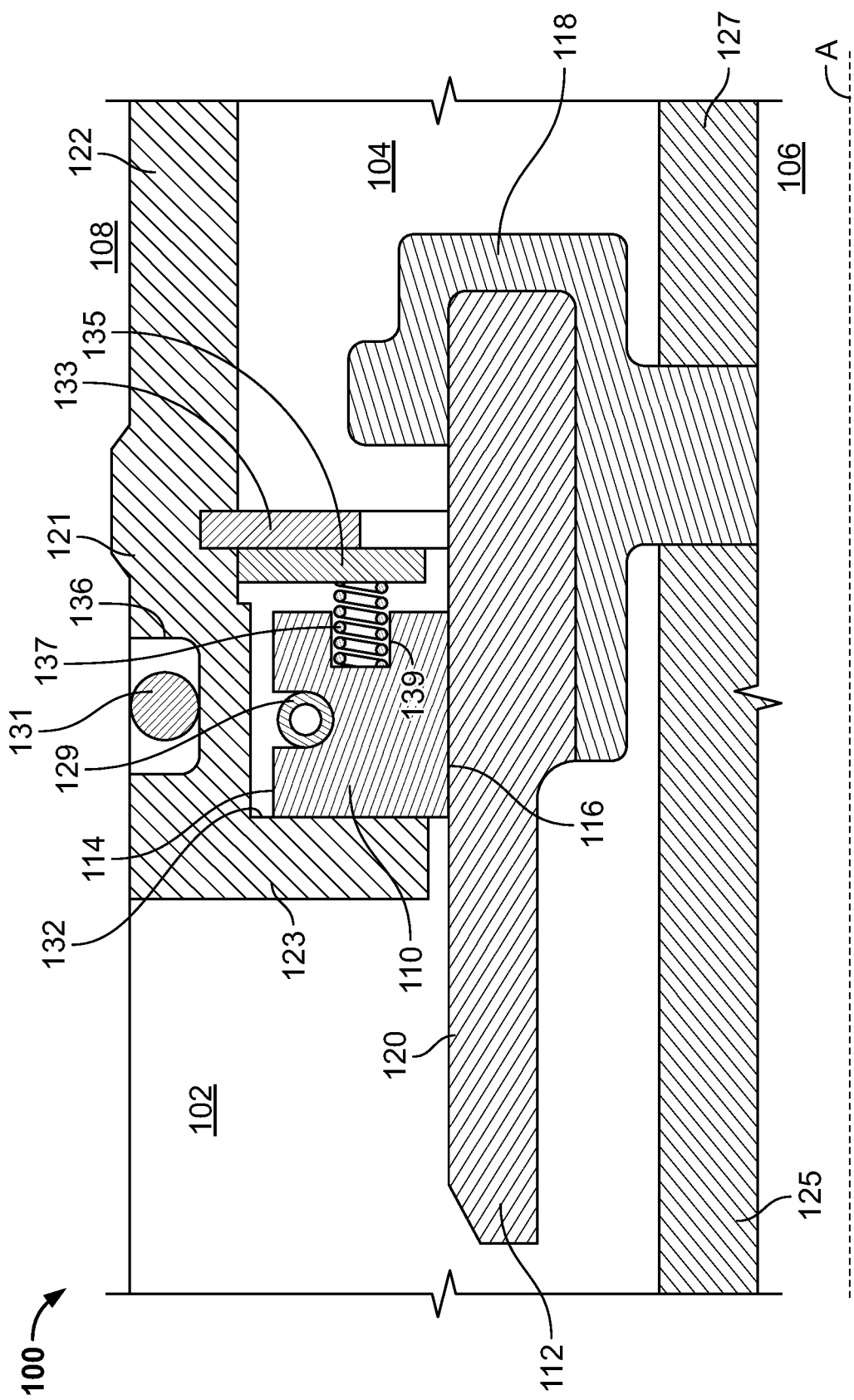
FIG. 1 is a schematic cross sectional view of a seal assembly in accordance with some embodiments of the present disclosure.

The present application discloses illustrative (i.e., example) embodiments. The claimed inventions are not limited to the illustrative embodiments. Therefore, many implementations of the claims will be different than the illustrative embodiments. Various modifications can be made to the claimed inventions without departing from the spirit and scope of the disclosure. The claims are intended to cover implementations with such modifications.

DETAILED DESCRIPTION

For the purposes of promoting an understanding of the principles of the disclosure, reference will now be made to a number of illustrative embodiments in the drawings and specific language will be used to describe the same.

Carbon seal assemblies in rotating machines such as gas turbine engines typically comprise a seal ring engaged with a runner. The runner is carried by a rotatable shaft. Engagement between the seal ring and runner creates the seal. However, in many seal assemblies engagement between the seal ring and runner is not maintained during all or substantially all operating conditions. Machine operation generally causes wide fluctuations in the temperatures to which the seal ring and runner are exposed, and as the components are subject to these changing temperatures they may expand or contact at different rates and therefore become sufficiently separated as to lose engagement and thus decrease the effectiveness of the seal.

The present disclosure is therefore directed to seal assemblies that maintain effective engagement between the seal ring and the runner across a wide range of temperatures and operating conditions. Specifically, the present disclosure is directed to systems and methods of forming a seal in a rotating machine. A seal assembly may comprise a seal ring and a runner that are formed from materials having coefficients of thermal expansion that are matched to effect sealing engagement between the seal ring and runner over a predetermined range of operating temperatures.

A schematic cross sectional view of an embodiment of the seal assembly 100 is provided in FIG. 1. The seal assembly 100 seals a higher pressure fluid cavity 104 from a lower pressure fluid cavity 102. The higher and lower pressure fluid cavities 104, 102 may be at least partially disposed between a rotatable shaft 106 and a sump housing 108. The seal assembly 100 comprises a seal ring 110 and circumferential runner 112.

The higher pressure cavity 104 may be referred to as a first cavity, and may be, for example, a region of a rotating machine such as a gas turbine engine that receives and directs higher pressure and/or higher temperature airflow. The lower pressure cavity 102 may be referred to as a second cavity, and may be, for example, a region of a rotating machine such as a gas turbine engine that receives and directs lower pressure and/or lower temperature airflow. The lower pressure cavity 102 may be a sump.

The rotatable shaft 106 may define an axis A of the rotating machine. The rotatable shaft may be hollow. A sump housing 108 may be disposed about or radially outward of the rotatable shaft 106. The sump housing 108 may be radially displaced from the shaft 106. The sump housing 108 may be a static structure of the rotating machine (i.e. may not rotate).

The seal ring 110 is disposed between the sump housing 108 and the shaft 106. The seal ring 110 may be annular, and may be formed as a single member or may comprise more than one member. In embodiments having a seal ring 110 comprising more than one member, the member may be joined for example by slip joints. The seal ring 110 may also comprise a single annular member. The seal ring 110 may have a radially outward facing surface 114 and a radially inward facing seal surface 116. The seal ring may comprise carbon.

The runner 112 may be an annular member and may be radially displaced from the shaft 106. The runner 112 may be carried by the shaft 106. The runner 112 may be carried by the shaft 106 via a runner mount 118. The runner 112 may have a radially outward facing surface 120 extending axially along the shaft 106. The runner 112 may comprise ceramic. The runner 112 may comprise silicon carbide, silicon nitride, or alumina.

The seal ring 110 may be an archbound carbon seal. The seal ring 110 may sealingly engage the runner 112. A seal ring 110 that is sealingly engaged with a runner 112 is in contact with the runner 112 or in sufficient proximity to the runner 112 such that a seal is formed between the seal ring 110 and runner 112. The radially inward facing surface 116 of the seal ring 110 may sealingly engage the radially outward facing surface 120 of the runner 112. In some embodiments, the radially inward facing surface 116 of the seal ring 110 may contact the radially outward facing surface 120 of the runner 112.

The seal ring 110 and runner 112 may be formed from materials having coefficients of thermal expansion that are matched to effect sealing engagement between the seal ring 110 and runner 112. The sealing engagement between the seal ring 110 and runner 112 may be effected over a predetermined range of operating temperatures. For example, the predetermined range of operating temperatures may be from −65° F. to 1000° F.

The seal ring 110 may be formed from a first material having a first coefficient of thermal expansion (CTE). The runner 112 may be formed from a second material having a second CTE. In some embodiments the second CTE is no more than 10% greater than the first CTE. In some embodiments the second CTE is no more than 2% greater than the first CTE. In some embodiments the value of the second CTE is between 95% and 105% of the value of the first CTE.

In some embodiments the coefficient of thermal expansion of the material of the runner is no more than 10% greater than the coefficient of thermal expansion of the material of the seal ring. In some embodiments the coefficient of thermal expansion of the material of the runner is no more than 2% greater than the coefficient of thermal expansion of the material of the seal ring. In some embodiments the coefficient of thermal expansion of the material of the runner is between 95% and 105% of the coefficient of thermal expansion of the material of the seal ring.

The CTE of a carbon seal ring 110 is typically lower than that of a metal runner found in the prior art. It is therefore desirable to match the CTE of the ceramic runner 112 by selecting a ceramic material with a CTE lower than that of the metal runner found in the prior art.

In some embodiments, the seal assembly 100 further comprises a seal housing 122. The seal housing 122 may be disposed between the runner 112 and the sump housing 108, and/or between the seal ring 110 and the sump housing 108. The seal housing 122 may comprise an axially-extending portion 121 and a radially-extending portion 123. The axially extending portion 121 may be engaged with or in contact with the sump housing 108. The radially extending portion 123 may comprise an axially facing surface 132 and may be engaged with or in contact with the seal ring 110. The seal ring 110 may sealingly engage the axially facing surface 132 of the radially extending portion 123 of the seal housing 122. The seal ring 110 may be aided in sealingly engaging the axially facing surface 132 by the axial load on the seal ring 110 caused by the pressure difference between the higher pressure cavity 104 and lower pressure cavity 102.

In some embodiments, the seal assembly 100 further comprises a runner mount 118. The runner mount 118 may extend radially to space the runner 112 from the shaft 106. The runner mount 118 may allow for some relative movement between the runner 112 and the shaft 106, largely owing to different coefficients of thermal expansion of the materials of the runner 112 and the shaft 106. The runner mount 118 may be interference fit to the shaft 106, and may be axially held in position by one or both of a forward stop 125 and aft stop 127. The runner mount 118 may be referred to as a mounting element. The runner mount 118 may carry the runner 112.

In some embodiments, the seal assembly 100 further comprises a garter spring 129. The garter spring 129 may be disposed radially outward of and engaged with a radially outer surface of the seal ring 110. The garter spring 129 may aide with maintaining engagement of the seal ring 110 to the runner 112.

A sealing body 131, such as an O-ring, may be disposed between and sealingly engaged between the seal housing 122 and sump housing 108. The seal housing 122 may define a groove 136, and the sealing body 131 may be positioned in the groove 136.

In some embodiments, the seal assembly 100 further comprises one or more of a snap ring 133, back plate 135, and axial spring 137. The snap ring 133 may extend between the seal housing 122 and the runner 112, and may be positioned axially aft of the seal ring 110. The back plate 135 may be positioned axially forward of the seal ring 110 and adjacent and/or abutting the snap ring 133. The axial spring 137 may extend between the back plate 135 and the seal ring 110. The axial spring 137 may apply a force in an axially forward direction to aide in maintaining engagement of the seal ring 110 to the portion 123 of the seal housing 122. The axial spring 137 may be partly disposed in a recess 139 defined by the seal ring 110. The axial spring 137 may be a coil spring. The axial spring 137 may forcibly engage the seal ring 110 to the seal housing 122.

In a non-operating condition, the shaft 106 is not rotating and the garter spring 129 imparts a radially inward force on the seal ring 110 to maintain the seal ring 110 sealingly engaged against the runner 112. The axial spring 137 will impart an axially forward force on the seal ring 110 to maintain the seal ring 110 sealingly engaged against the seal housing 122. The seal ring 110 sealingly engaged with the runner 112 and seal housing 122 creates a seal between the higher pressure cavity 104 and the lower pressure cavity 102.

When the rotating machine begins to operate, friction between the seal ring 110 and runner 112 will generate heat, causing thermal expansion of these components. With matched coefficients of thermal expansion, the seal ring 110 and runner 112 will thermally expand at the same or similar rates, thus ensuring that the seal ring 110 and runner 112 will remain engaged throughout the full range of thermal transients caused by startup and operation of the rotating machine. Any radial gap between the seal ring 110 and runner 112 will similarly remain at a constant or near-constant radial dimension throughout the full range of thermal transients, thus providing a consistent leakage rate which may be preferable to leakage rates in the prior art that may vary considerably. The shaft 106 will deflect due to rotation, but the modulus of elasticity of ceramics are very large so this deflection will be very low and therefore negligible compared to thermal expansion deflections.

The present disclosure provides numerous advantages over existing seal assemblies. The disclosed seal assembly 100 substantially reduced the heat generation as compared to a CCCS with metal runner. The use of an archbound seal ring in place of a contacting seal ring is responsible for greatly reducing heat generation. This reduction in heat generation results in a reduction and/or elimination of the need for direct application of oil for cooling purposes. Thus, the disclosed seal assembly is intended to be oil-free. In sumps, there is generally an oil mist caused by the oil that is needed for bearings. Therefore, the seal assembly 100 may be generally exposed to oil or an oil mist, but direct oil cooling to the seal assembly 100 is not required.

Advantages of a low-heat-generation, oil-free seal assembly (seal assembly lacking direct application of oil) include reduced risk of oil coking, fires, excessive stresses on the runner, and excessive wear of the seal ring. Additionally, the removal of the requirement to directly apply oil to the runner may result in smaller sump sizes (owing to a lower volume of oil to be collected in the sump), smaller and more simple systems associated with direct application of oil (oil passageways, breathers, etc.), and less overall system complexity.

Replacement of a metal runner, as used in a CCCS with metal runner seal assembly, with a ceramic runner is also advantageous. Specifically, this replacement likely reduces the overall thermal expansion of the runner, which in turn results in lower friction and wear of the seal ring. Heat generated by friction between the seal ring and runner will not lead to excessive thermal expansion of the runner.

Another advantage of the disclosed seal assembly is greatly reduced wear on the seal ring as compared to the highest thermal transients in a CCCS with metal runner seal assembly. In the prior art, high thermal transients potentially cause a large mismatch between thermal expansion of the seal ring and runner, causing the runner to excessively wear the seal ring by friction. Once the high thermal transient passes the seal ring remains excessively worn, leading to a larger than desirable gap between the seal ring and runner. By comparison, the disclosed seal assembly avoids this large mismatch in thermal expansion, thus negating the excessive wear described in this scenario and maintaining a smaller gap between the seal ring and runner.

Thus the disclosed seal assembly provides a similar degree of sealing as a contacting carbon seal member with a metal runner, but achieves this performance level without the use of direct application of oil for cooling. Further, the useful lifetime of the archbound seal ring is not significantly impacted when comparing the disclosed seal assembly to a contacting carbon seal member with metal runner embodiment.

Figure 2:
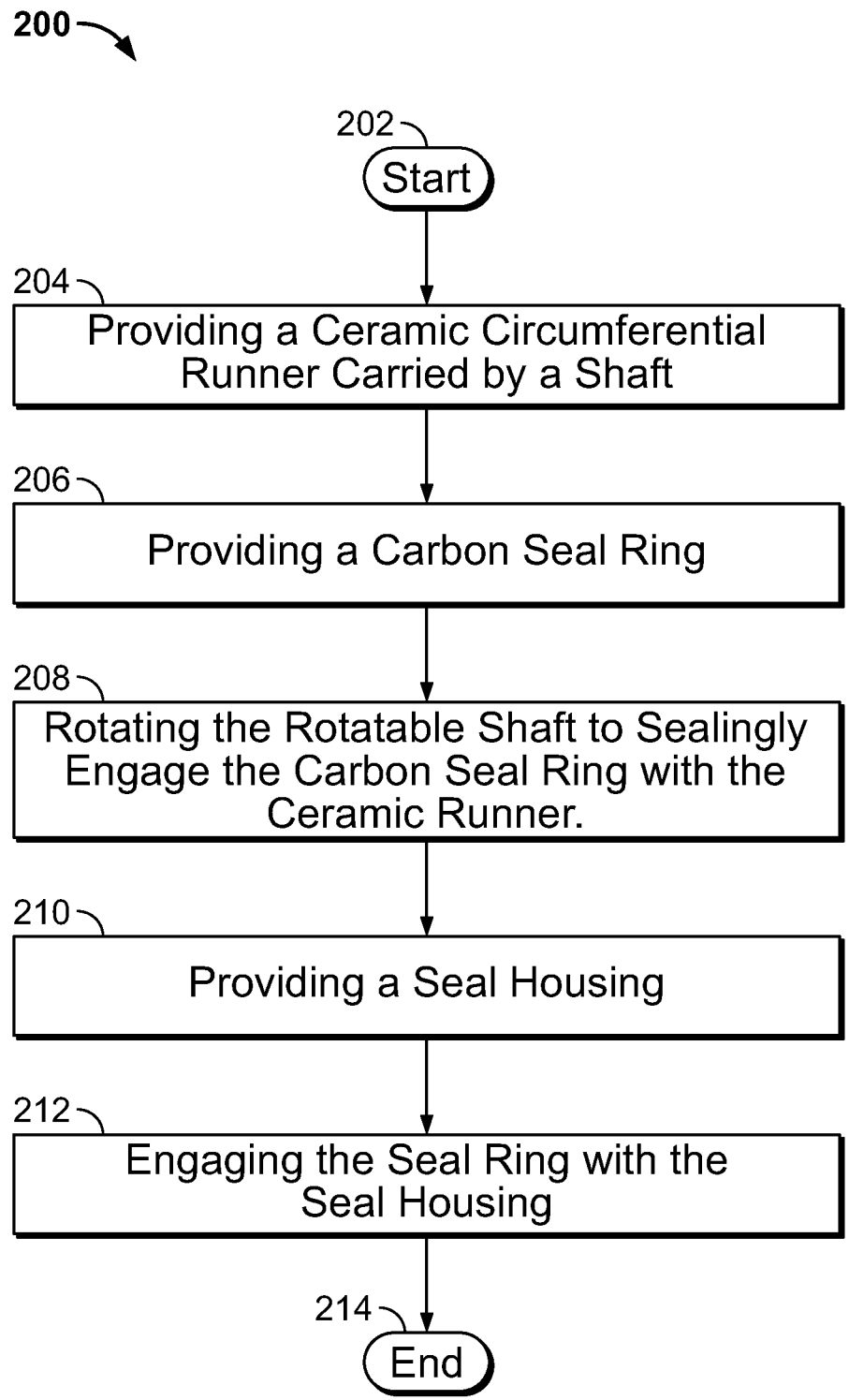
FIG. 2 is a flow diagram of a method in accordance with some embodiments of the present disclosure.

The present disclosure additional provides methods of sealing a higher pressure fluid cavity 104 from a lower pressure fluid cavity 102. FIG. 2 presents a flow chart of one such method 200. The higher pressure fluid cavity 104 and lower pressure fluid cavity 102 are at least partly disposed between a rotatable shaft 106 and a sump housing 108 radially displaced from the rotatable shaft 106.

Method 200 starts at Block 202. The steps of method 200, presented at Blocks 202 through 214, may be performed in the order presented in FIG. 2 or in another order. One or more steps of the method 200 may not be performed.

At Block 204, a ceramic circumferential runner 112 is provided. The runner 112 may be an annular member and may be radially displaced from the shaft 106. The runner 112 may be carried by the shaft 106. The runner 112 may be carried by the shaft 106 via a runner mount 118. The runner 112 may have a radially outward facing surface 120 extending axially along the shaft 106.

At Block 206, an archbound carbon seal ring 110 is provided. The seal ring 110 may be annular, and may be formed as a single annular member. The seal ring 110 may have a radially outward facing surface 114 and a radially inward facing surface 116. The seal ring 110 and runner 112 may be formed from materials having coefficients of thermal expansion that are matched to effect sealing engagement between the radially inward facing surface 116 of the seal ring 110 and the radially outward facing surface 120 of the runner 112. The sealing engagement between the seal ring 110 and runner 112 may be effected over a predetermined range of operating temperatures.

In some embodiments the coefficient of thermal expansion of the material of the runner is no more than 10% greater than the coefficient of thermal expansion of the material of the seal ring. In some embodiments the coefficient of thermal expansion of the material of the runner is no more than 2% greater than the coefficient of thermal expansion of the material of the seal ring. In some embodiments the coefficient of thermal expansion of the material of the runner is between 95% and 105% of the coefficient of thermal expansion of the material of the seal ring.

At Block 208, the rotatable shaft 106 is rotated to sealingly engage the archbound carbon seal ring 110 with the ceramic runner 112. With matched coefficients of thermal expansion, the seal ring 110 and runner 112 will thermally expand at the same or similar rates, thus ensuring that the seal ring 110 and runner 112 will remain engaged throughout the full range of thermal transients caused by startup and operation of the rotating machine. Any radial gap between the seal ring 110 and runner 112 will similarly remain at a constant or near-constant radial dimension throughout the full range of thermal transients.

At Block 210, a seal housing 122 may be provided. The seal housing 122 may be disposed between the runner 112 and the sump housing 108, and/or between the seal ring 110 and the sump housing 108. The seal housing 122 may comprise an axially-extending portion 121 and a radially-extending portion 123. The axially extending portion 121 may be engaged with or in contact with the sump housing 108.

At Block 212, the seal ring 110 may be engaged with the seal housing 122. The radially extending portion 123 of the seal housing 122 may comprise an axially facing surface 132 and may be engaged with or in contact with the seal ring 110. The seal ring 110 may sealingly engage the axially facing surface 132 of the radially extending portion 123 of the seal housing 122. An axial spring 137 may extend between a back plate 135 and the seal ring 110, and may apply a force in an axially forward direction to aide in maintaining engagement of the seal ring 110 to the portion 123 of the seal housing 122.

Method 200 ends at Block 214.

The disclosed seal assembly may, in some embodiments, be an oil-free seal assembly. As used herein, oil-free indicates a lack of direct oil application. An oil mist may still be used in a cavity isolated by the seal assembly for general cooling purposes; however, oil is not directly applied to the seal assembly itself.

Although examples are illustrated and described herein, embodiments are nevertheless not limited to the details shown, since various modifications and structural changes may be made therein by those of ordinary skill within the scope and range of equivalents of the claims.

What is claimed is:

1. A seal assembly for sealing a higher pressure fluid cavity from a lower pressure fluid cavity, said cavities at least partially disposed between a rotatable shaft and a sump housing radially displaced from said rotatable shaft, the seal assembly comprising:
    a circumferential runner carried by the shaft having a radially outward facing seal surface extending axially along the shaft;
    a runner mount fixed to the shaft and extending radially outward away from the shaft, the runner mount including a radially outer portion engaged with the radially outward facing seal surface of the circumferential runner and a radially inner portion spaced apart from the radially outer portion to define a space that receives the circumferential runner therebetween and positions the circumferential runner to extend axially forward from the space such that a forward end of the circumferential runner is cantilevered to the runner mount, wherein the runner mount retains the circumferential runner to the shaft in a fixed radial position, and
    a seal ring sealing engaged with the sump housing and having a radially inward facing seal surface that is biased radially inward into engagement with the radially outward facing seal surface such that the seal ring is movable relative to the sump housing to sealingly engage said radially outward facing seal surface of said runner, wherein the seal ring is offset axially forward from the radially outer portion of the runner mount and is positioned at least partially above the radially inner portion;
    wherein said runner and said seal ring are formed from materials having coefficients of thermal expansion that are matched to effect sealing engagement between said runner and said seal ring over a predetermined range of operating temperatures and to match radial movement of the seal ring with radial movement of the circumferential runner as the seal assembly thermally expands and contracts, and
    wherein a coefficient of thermal expansion of the material of the runner is no more than 10% greater than a coefficient of thermal expansion of the material of the seal ring.

2. The seal assembly of claim 1 wherein the predetermined range of operating temperatures is −65° F. to 1000° F.

3. The seal assembly of claim 1 wherein the coefficient of thermal expansion of the material of the runner is no more than 2% greater than the coefficient of thermal expansion of the material of the seal ring.

4. The seal assembly of claim 1 wherein said radially inward facing seal surface of said seal ring contacts said radially outward facing seal surface of said runner during rotation of said shaft.

5. The seal assembly of claim 1 wherein said runner comprises ceramic.

6. The seal assembly of claim 5 wherein said runner comprises one or more of silicon carbide, silicon nitride, and alumina.

7. The seal assembly of claim 1 wherein said seal ring is an archbound seal ring and comprises carbon.

8. The seal assembly of claim 1 wherein said carbon seal ring has a radially outward facing surface, said seal assembly further comprising:
    a seal housing disposed between said carbon seal ring and said sump housing; and
    a sealing body sealingly engaged between said sump housing and said seal housing.

9. The seal assembly of claim 8 wherein said seal housing defines an axially facing surface, and wherein said carbon seal ring sealingly engages said axially facing surface.

10. The seal assembly of claim 9 further comprising an axial coil spring contacting said carbon seal ring at a surface opposite said axially facing surface of said seal housing, said axial coil spring forcibly engaging said carbon seal ring to said seal housing.

11. The seal assembly of claim 10 further comprising a garter spring positioned radially outward of said carbon seal ring and assisting with the sealing engagement of said carbon seal ring to said ceramic runner.

12. An oil-free circumferential seal assembly for a machine having a rotatable shaft and an axis of rotation, said seal assembly comprising:
a ceramic circumferential runner having a radially outward facing seal surface extending axially along the shaft;
a mounting element affixed around a circumference of the shaft and carrying the ceramic runner; the mounting element extending radially outward away from the shaft and including a radially outer portion engaged with the radially outward facing surface of the circumferential runner and a radially inner portion spaced apart from the radially outer portion to define a space that receives the circumferential runner therebetween and positions the circumferential runner to extend axially forward from the space such that a forward end of the circumferential runner is cantilevered to the mounting element, wherein the mounting element retains the circumferential runner to the shaft in a fixed radial position, and
an archbound carbon seal ring, said seal ring having a radially inward facing seal surface that is biased radially inward into engagement with the radially outward facing seal surface such that the seal ring is movable relative to the sump housing to sealingly engage with the radially outward facing seal surface of the ceramic runner;
wherein said runner and said seal ring are formed from materials having coefficients of thermal expansion that are matched to effect sealing engagement between said runner and said seal ring over a predetermined range of operating temperatures and to match radial movement of the seal ring with radial movement of the circumferential runner as the seal assembly thermally expands and contracts.

13. The oil-free circumferential seal assembly of claim 12 wherein the predetermined range of operating temperatures is from −65° F. to 1000° F.

14. The oil-free circumferential seal assembly of claim 13 wherein the coefficient of thermal expansion of the material of the runner is between 95% and 105% of the coefficient of thermal expansion of the material of the seal ring.

15. The oil-free circumferential seal assembly of claim 12 further comprising:
a seal housing disposed radially outward of the seal ring; and
a sealing body positioned between the seal housing and the sump housing.

16. A method of sealing a higher pressure fluid cavity from a lower pressure fluid cavity, said cavities at least partially disposed between a rotatable shaft and a sump housing radially displaced from said rotatable shaft, the method comprising:
providing a ceramic circumferential runner carried by the shaft and having a radially outward facing seal surface extending axially along the shaft;
supporting the ceramic circumferential seal radially outward from the shaft by a runner mount coupled to the shaft in a fixed position for rotation therewith, the runner mount including a radially outer portion engaged with the radially outward facing surface of the circumferential runner and a radially inner portion spaced apart from the radially outer portion to define a space that receives the circumferential runner therebetween and positions the circumferential runner to extend axially forward from the space such that a forward end of the circumferential runner is cantilevered to the runner mount, wherein the runner mount retains the circumferential runner to the shaft in a fixed radial position,
providing a carbon seal ring having a radially inward facing seal surface,
biasing the carbon seal ring radially inward into engagement with the radially outward facing seal surface such that the seal ring is movable relative to the sump housing to sealingly engage with the radially outward facing seal surface of the ceramic runner,
wherein said runner and said seal ring are formed from materials having coefficients of thermal expansion that are matched to effect sealing engagement between said radially inward facing seal surface and said radially outward facing seal surface over a predetermined range of operating temperatures and to match radial movement of the seal ring with radial movement of the circumferential runner as the seal assembly thermally expands and contracts; and
rotating said rotatable shaft to sealingly engage said radially inward facing seal surface of said carbon seal ring with said radially outward facing seal surface of said ceramic runner.

17. The method of claim 16 wherein the coefficient of thermal expansion of the material of the seal ring is between 95% and 105% of the coefficient of thermal expansion of the material of the runner.

18. The method of claim 16 further comprising:
providing a seal housing coupled to said sump housing; and
engaging said seal ring with said seal housing.

19. The method of claim 16 wherein the predetermined range of operating temperatures is from −65° F. to 1000° F.

* * * * *